Figure 1:
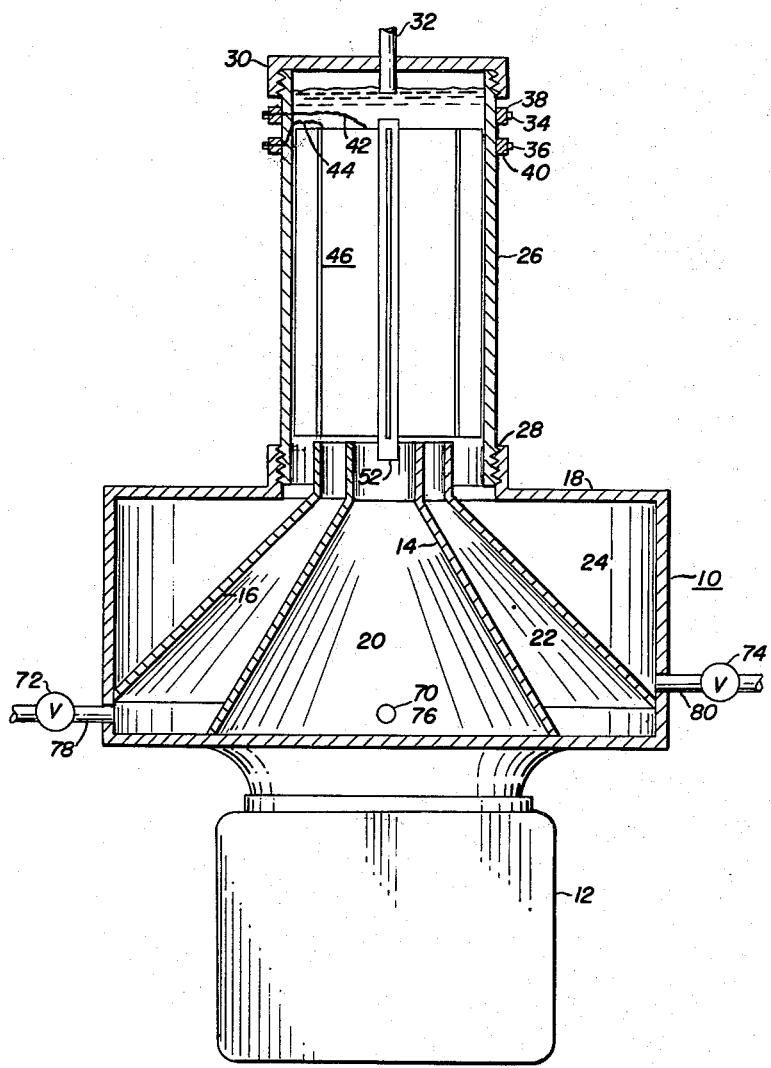

INVENTOR.
ROBERT B. Mc.EUEN
BY
ATTORNEY

INVENTOR.
ROBERT B. MC EUEN
BY
ATTORNEY 3,197,393
METHOD AND APPARATUS FOR DIELECTRO-
PHORETIC SEPARATION OF POLAR PARTICLES
Robert B. McEuen, Brawley, Calif., assignor to The Pure
Oil Company, Chicago, Ill., a corporation of Ohio
Filed Mar. 27, 1961, Ser. No. 98,385
8 Claims. (Cl. 204—180)

This invention relates to a method and apparatus for the dielectrophoretic separation of polar and nonpolar particles of macroscopic size.

It is well known that charged particles or ions can be separated from particles which have no charge by disposing the particles in suspension or solution to the influence of an electric field of unidirectional potential, and it is further known that uncharged particles can be separated from a liquid suspension and coagulated by the application of intense non-uniform electric fields, this mode of separation being known as dielectrophoresis. Particles which possess no net positive or negative charge may be classified as polar or nonpolar. Polar particles are those which, though neutral in that they possess no net charge, have within the particle areas of positive and negative charge which produce large dipole moments. Other particles, which have no net charge, may come to possess large dipole moments when exposed to the influence of an electric field, and such particles are classified as polar particles in this specification. Still other particles, though composed of the same material as polar particles, and having no net electric charge, have no dipole moment and exhibit a negligible dipole moment under the influence of intense electric fields.

Macroscopic particles, unlike ions, atoms, and molecules, have widely varying geometric shapes, and the systems of atoms or ions within each particle may assume any orientation. Because of this "steric effect," there exists a double infinity of possible permanent dipole moments in particles of given volume and chemical composition. This "steric effect" determines the compactness and geometry of the physically adsorbed atmosphere which surrounds each individual particle in a suspension. Because an induced dipole moment is produced in the adsorbed atmosphere when distorted by an applied field, the "steric effect" ultimately affects the strength of the induced dipole moment.

The apparatus and method of this invention are based on the use of the dielectrophoretic force produced by a non-uniform electric field in conjunction with an opposing applied centrifugal force, to segregate polar particles from nonpolar particles. Briefly, the apparatus of this invention comprises means for subjecting particles suspended in a fluid to centrifugal force, means for simultaneously subjecting the particles to a non-uniform electric field capable of producing a dielectric force opposite in sense to the centrifugal force, and means for separating the particles concentrated at different zones in the suspending fluid under the net influence of the opposing forces.

Figure 2:
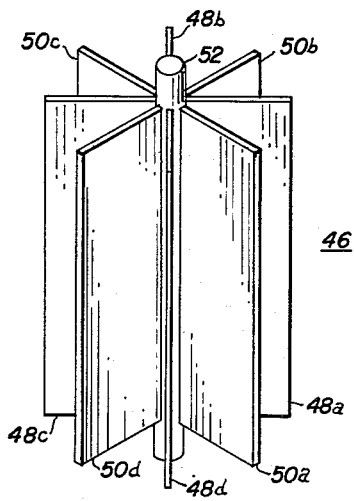
Figure 3:
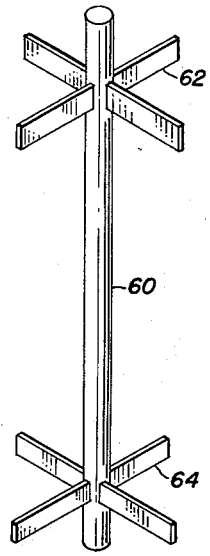
Figure 4:
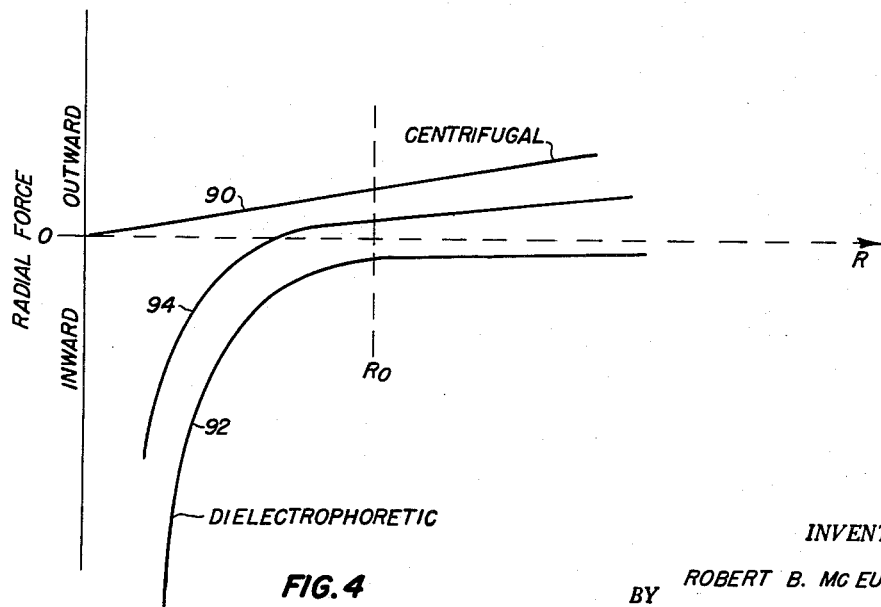

The method and apparatus of the invention are best described with reference to the drawings, of which:

FIGURE 1 is a frontal elevational view, partly in section, of the apparatus of this invention, FIGURE 2 is a perspective view of the electrode assembly employed in the apparatus depicted in FIGURE 1, FIGURE 3 is a perspective view of an alternate electrode assembly, and FIGURE 4 is a graph showing the relationship between centrifugal force and dielectrophoretic force applied to particles at varying radial distances from the axis of rotation of the apparatus depicted in FIGURE 1.

Referring to FIGURE 1, particle-segegrating receptacle 10 is rotatatively supported upon housing 12, which housing contains a motor and appropriate gearing for rotating the particle-segregating receptacle 10 about a vertical axis. Receptacle 10 contains coaxially mounted tubes 14 and 16, which, together with the shell 18 of the receptacle, forms three separate particle-receiving reservoirs, 20, 22, and 24. Cylindrical separating-chamber 26 is threaded to receptacle 10 at 28, and is supported for rotation therewith. Separating-chamber 26 is provided with a threaded cover 30, which cover is provided with a fluid inlet-line 32. Slip-rings 34 and 36 are supported by electrically insulating slip-ring supports 38 and 40, such that the slip-rings are mounted coaxially with respect to the chamber 26 for rotation therewith. Brush means, not shown, make contact with the slip-rings to provide means for introducing high electric potential through the slip-rings and conductors 42 and 44 to electrode assembly 46.

Referring to FIGURE 2, electrode assembly 26 is seen to comprise eight electrically conductive vanes. The vanes are divided into two sets, those represented by the characters 48a–d and by the characters 50a–d. The vanes are supported by electrically insulating rod 52. All of the vanes represented by the numerals 48 are electrically connected together, and connected to one of the conductors, 42 and 44, which communicate with the slip-rings 34 and 36. The other set of vanes, designated by the numeral 50, are electrically connected together and connected to the other slip-ring. Thus, when electrical potential is applied to the slip-rings, charges of opposite polarity are applied to adjacent vanes.

An alternate electrode structure is presented in FIGURE 3. Rod 60 is supported from electrode chamber 26 by means of electrically insulating crosses 62 and 64. The cylindrical interior surface of wall 26 is fabricated of an electrically conductive material when the electrode system of FIGURE 3 is employed. The conductor leading from one slip-ring is attached to rod 60, and the conductor attached to the second slip-ring is connected to the conductive interior surface of chamber 26.

In operation, a low-dielectric-constant liquid is introduced into the apparatus until both receptacle 10 and separating-chamber 26 are filled to above the electrode assembly 46. The device is then rotated by means of the electric motor and gearing contained within base 12, and high-voltage electric potential, either alternating or direct, is applied to slip-rings 34 and 36 and thence to the electrode assembly 46. A slurry containing mixed polar and nonpolar macroscopic particles suspended in the same liquid used to fill receptacle 10 and chamber 26 is now added through inlet 32. Where the particles have a density and dipole moment constant greater than that of the suspending fluid, the polar particles accumulate adjacent to the insulating support-rod 52 of the electrode assembly, and drop into chamber 20 of receptacle 10. Nonpolar particles accumulate adjacent to the exterior of the chamber 26, and drop into receiving chamber 24. A smaller quantity of particles having a small dipole moment are collected in receiving chamber 22. Flow of fluid from chambers 20, 22, and 24 is provided by opening valves 70, 72, and 74, which control outlets 76, 78, and 80. Particles suspended in the fluid may be recycled from either of the collecting chambers to the fluid inlet 32.

The force applied to the particles by rotation of the apparatus is proportional to the mass of the particle, the distance of the particle from the axis of rotation, and the square of the angular velocity of rotation. Accordingly, as the distance of the particle from the axis of rotation increases, the tendency of the particle to migrate will increase. The force applied to the particle to produce migration is in proportion to the difference in the densities of the particle and the suspending fluid. Where the particle and suspending fluid are the same density, the centrifugal force applied to the particle equals the force applied to an equal volume of fluid, and there is no movement of the particle. Where the density of the particle is greater than that of the fluid, the particle will tend to migrate towards the periphery of the cylindrical separating-chamber. Where the density of the particle is less than that of the suspending fluid, the particle will tend to migrate towards the axis of rotation of the separating chamber.

The dielectrophoretic force applied to the particle is dependent upon the degree of divergence of the electric field applied, and this is influenced by the specific electrode arrangement employed. For the electrode assembly shown in FIGURE 2, the dielectrophoretic force will be proportional to the total dipole moment of the particle, and the magnitude of the electric potential applied to produce the divergent electric field, and will be inversely proportional to the square of the distance of the particle from the center of the divergent field.

Referring to FIGURE 4, a graph depicting the magnitude of net forces applied to a particle at varying radial distances from the axis of the separating vessel is shown. Curve 90 is a plot of the outward centrifugal force applied to the particle. Such a force is applied when the density of the particle is greater than that of the liquid. When the density of the particles is less than that of the liquid, the force will be opposite in direction. Curve 92 is a plot of the dielectrophoretic force applied to a particle having a total dipole moment differing from that of an equal volume of suspending liquid. The direction of the force is radially inward in sense when the total dipole moment of the particle is greater than that of the liquid, and outward in sense when the total dipole moment of the particle is less than that of an equal volume of liquid. This latter case can occur only when the liquid is composed of extremely long-chain molecules, such as polymers. Curve 94 is a plot of the net force applied to the particle under the influence of applied centrifugal and dielectrophoretic forces. It will be evident that there is a radial distance $R_0$ from the axis of rotation and axis of the applied electric field where the net force applied to the particle is zero. Accordingly, there exists a cylindrical surface of zero net particle force within the separating chamber. This surface defines the plane of particle separation. It will be evident that by adjusting the factors which influence the magnitude of the centrifugal and dielectrophoretic forces, such as rate of rotation of the vessel, and magnitude of applied potential, the location of the surface of separation may be adjusted radially inward or outward as desired. Accordingly, by proper adjustment, collection of particles, a preponderance of which have a predetermined minimum dipole moment, is possible.

Particles which can be separated in accordance with the method of this invention include a wide variety of materials having particle sizes in the range of about 0.1 to 20 microns diameter. While various suspending fluids may be employed, highly refined hydrocarbons are preferred. Suitable are fluids such as benzene, toluene, normally liquid paraffinic hydrocarbons, and refined white oils. The applied voltages may vary over a wide range, and may be either direct potentials or alternating potentials. Alternating potentials are preferred because they eliminate the possibility of concomitant migration of charged particles in the system, as will occur when direct potentials are employed. A sinusoidal, or more preferably, a square-wave voltage is employed. Potentials may range from 1,000 to 20,000 volts.

Particles of silica generally occur in random distribution with respect to dipole moment. Segregation of polar and nonpolar silica particles is possible in accordance with this invention. Clay particles may also be segregated, for it is known that the dipole moment of montmorillonite and kaolinite differ decreasingly in the order stated. Accordingly, a clay sample containing these constituents can be analyzed by segregating the clay particles in accordance with their dipole moments.

As a specific example of the method of this invention, 20 grams of silica having an average particle size of 2 microns are suspended in 2,000 grams of highly refined white oil. This suspension is charged to an apparatus fabricated as depicted in FIGURE 1 and having a separation-chamber radius of 6 inches. The chamber is rotated at 300 r.p.m. for a period of 8 hours, during which time an alternating potential of 20,000 volts is applied to the slip-rings. The particle distribution is found to be 6 grams polar, 8 grams nonpolar, 2 grams intermediate polarity, and 4 grams unrecovered.

The embodiments of the invention in which an exclusive property or privilege is claimed are defined as follows:

1. The method of segregating polar particles from nonpolar particles comprising suspending a mixture of said particles in a non-conductive fluid having a density and dielectric constant differing substantially from that of said particles, midly centrifuging the particle-fluid suspension while subjecting the suspension to the effect of a non-uniform alternating electric field having a maximum field intensity coxial with the axis of centrigugal force imposed on said suspension, and decreasing intensity as said field extends radially outward from said axis of centrifugal force, and collecting particles at the radial extremities of said field.

2. The method in accordance with claim 1 in which said particles are of higher dipole moment and density than an equal volume of fluid and said polar particles are collected at the zone of maximum field intensity.

3. The method in accordance with claim 1 in which said particles are of lower dipole moment and density than an equivalent volume of fluid, and the less polar particles are collected at the zone of minimum field strength.

4. The method in accordance with claim 1 in which the suspension is subjected to a potential from about 1,000 to about 20,000 volts.

5. The method in accordance with claim 2 in which the volume of particle-fluid suspension exposed to said field is cylindrical in shape, and said mixture of particles is introduced at one end of said cylinder, passed in generally axial direction therethrough, and removed as separated polar and nonpolar particles from the opposite end of said cylinder.

6. An apparatus for separating polar particles from non-polar particles in fluid suspension therewith comprising a cylindrical fluid chamber, means for supporting said chamber for rotation about a verticle axis, means for rotating said chamber, a plurality of concentric particle-receiving tubes disposed adjacent the bottom of said chamber coaxially therewith, means for introducing a fluid suspension of mixed particles into the top of said chamber, electrode means including a plurality of electrically conductive vanes, for propagating a non-uniform electric field having a maximum intensity near the axis of rotation of said chamber and a decreased intensity near the cylindrical surface of said chamber, supported within said chamber, said vanes lying in a plurality of planes which pass through a common line, said line being coincident with the axis of said chamber, and means for applying alternating potential of opposite polarity to adjacent vanes.

7. An apparatus in accordance with claim 6 in which said vanes are eight in number, are substantially coextensive with the length of said chamber, and extend from near the axis of said chamber to the cylindrical surface thereof.

8. An apparatus in accordance with claim 6 in which said cylindrical fluid chamber has a radius of about 6 inches and said means for applying an alternating potential is adapted to apply a potential from about 1,000 to about 20,000 volts.

References Cited by the Examiner

UNITED STATES PATENTS

| | | | |
|---|---|---|---|
| 1,558,382 | 10/25 | Marx | 204—180 |
| 2,057,156 | 10/36 | Lyons | 204—180 |
| 2,337,291 | 12/43 | Adams et al. | 204—188 |
| 2,648,636 | 8/53 | Ellis | 204—180 |
| 2,853,448 | 9/58 | Heiskell | 204—180 |
| 2,992,979 | 7/61 | Magnuson | 204—180 |
| 3,005,763 | 10/61 | Kollsman | 204—301 |

OTHER REFERENCES

Pohl et al.: J. Electrochemical Soc., volume 107, No. 5, May 1960, pages 390–396.

Pohl: Scientific American, volume 203, No. 6 December 1960, pages eg 107–116.

WINSTON A. DOUGLAS, *Primary Examiner.*

JOHN H. MACK, JOHN R. SPECK, *Examiner.*